United States Patent
Nishide et al.

(10) Patent No.: US 8,748,037 B2
(45) Date of Patent: Jun. 10, 2014

(54) CATHODE AND ELECTROCHEMICAL DEVICE INCLUDING CATHODE

(71) Applicant: Samsung Electronics Co., Ltd., Suwon-si (KR)

(72) Inventors: Niroyuki Nishide, Tokyo (JP); Satoshi Nakajima, Tokyo (JP); Yuichi Aihara, Yokohama (JP)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/720,957

(22) Filed: Dec. 19, 2012

(65) Prior Publication Data

US 2013/0157150 A1    Jun. 20, 2013

(30) Foreign Application Priority Data

Dec. 20, 2011  (JP) ................................. 2011-278572
Dec. 20, 2011  (JP) ................................. 2011-278573
Nov. 27, 2012  (KR) ........................ 10-2012-0135561

(51) Int. Cl.
*H01M 4/02*       (2006.01)

(52) U.S. Cl.
USPC ................... 429/209; 439/231.3; 439/231.4; 439/231.8

(58) Field of Classification Search
USPC ..................... 429/209, 231.3, 231.4, 231.8
See application file for complete search history.

(56) References Cited

U.S. PATENT DOCUMENTS

| | | |
|---|---|---|
| 4,921,683 A | 5/1990 | Bedell |
| 5,171,644 A | 12/1992 | Tsou et al. |
| 5,215,820 A | 6/1993 | Hosokawa et al. |
| 5,314,760 A | 5/1994 | Tsou et al. |
| 5,384,397 A | 1/1995 | Zhang et al. |
| 5,580,682 A | 12/1996 | Chaloner-Gill |

FOREIGN PATENT DOCUMENTS

WO     02/20621 A1     3/2002

*Primary Examiner* — Jane Rhee
(74) *Attorney, Agent, or Firm* — Cantor Colburn LLP

(57) ABSTRACT

A cathode for use in an electrochemical device, the cathode including a polymer including a backbone, including a polyalkyleneimine-cobalt complex (PEI-Co complex), wherein polyalkyleneimine is coordinated to cobalt; and an electrode material effective for an oxidation-reduction reaction of oxygen, wherein oxygen is a cathode active material.

16 Claims, 7 Drawing Sheets

CATHODE AND ELECTROCHEMICAL DEVICE INCLUDING CATHODE

CROSS-REFERENCE TO RELATED APPLICATIONS

This application claims priority to and the benefit of Japanese Patent Application No. 2011-0278573, filed on Dec. 20, 2011, and Japanese Patent Application No. 2011-0278572, filed on Dec. 20, 2011, and Korean Patent Application No. 10-2012-0135561, filed on Nov. 27, 2012, the contents of which are incorporated herein in their entirety by reference.

BACKGROUND

1. Field

The present disclosure relates to a cathode and an electrochemical device. In particular, the present invention relates to a cathode for an electrochemical device, using oxygen as a cathode active material, and an electrochemical device including the cathode.

2. Description of the Related Art

Recently, electrochemical devices, such as a rechargeable secondary battery (for example, a lithium air battery), which use oxygen as a cathode active material have drawn attention. In such electrochemical devices, during discharging, oxygen is supplied from the outside (air or an external oxygen supplying device), and during charging and discharging, the oxygen is used for an oxidation-reduction reaction at an electrode. When a gas, such as oxygen, is used as a cathode active material, a method of connecting a device to a gas bomb (see, for example, JP 2010-528412), or a method of absorbing oxygen from the air by using an air intake in the device (open system) is typically used.

Among these methods, in consideration of decreasing weight or saving space, the method of connecting a device to a bomb is used only with regard to a device for large-capacity power generation and power storage based on a stationary type system. However, this connecting method is generally not suitable for small devices. When air is supplied to a device in which an air intake is installed, impurities, such as water, may penetrate to the device from the air. When an oxidation-reduction reaction of oxygen is used as a cathode reaction, impurities present in a cathode (air electrode) may reduce performance of a catalyst, and during power storage, may deteriorate cyclic performance.

Although these problems may be solved by using a method of filling an electrochemical device with a gas used as an active material (see, for example, JP 2001-273935), filling volume or filling pressure need to be taken into consideration. In addition, a method of controlling air intake by a system (see, for example, 2008-010230) has been disclosed. However, this method may lead to a high energy price due to an increase in the system cost.

In some methods, a partition wall, such as a polymer film, may be installed between a cathode and an air intake wherein oxygen diffuses into the polymer film to prevent the ingress of impurities into an electrochemical device or evaporation of a solvent (see, for example, JP 2007-080793 and JP 2006-134636). However, even when, as in JP 2007-080793 and JP 2006-134636, high oxygen-transmissible materials (for example, a polymer material, such as silicon rubber, disclosed in JP 2006-134636) are used, materials other than oxygen may also be transmitted, and ingress of impurities, such as water or other gas (carbon dioxide in the air), may not be prevented.

Evaporation of a solvent may be prevented by using an ionic liquid with no (or very small) vapor pressure, or ingress of water may be prevented by using water-repellent ionic liquid (see, for example, JP 2011-014478) has been reviewed. However, as in JP 2011-014478, since an ionic liquid is a salt, a small amount of water may permeate into an electrochemical device when it is exposed to the outside air, thereby leading to a decrease in electrochemical characteristics of the electrochemical device.

In addition, a method of disposing cobalt-porphyrin-benzylimidazole complex between a cathode reaction field and an air intake to selectively absorb oxygen (see, for example, JP 2004-319292) has been reported. However, when the method disclosed in JP 2004-319292 is used, the supplying of oxygen to an electrochemical device using oxygen as a cathode active material may be insufficient, because only one oxygen molecule per a unit constitutional molecule size of the complex is chemically bound. Thus, there remains a need for an electrochemical device with improved electrochemical characteristics and efficiency which would continuously supply oxygen as a cathode active material while preventing or suppressing ingress of impurities.

SUMMARY

The authors of the present disclosure have diligently worked to overcome the above problems, and as a result, found that due to the inclusion of a member that includes a polymer with a polyalkyleneimine-cobalt as a backbone to reversibly attach or detach oxygen in an electrochemical device using oxygen as a cathode active material, ingress of impurities into the device can be prevented or suppressed as much as possible and at the same time, oxygen may be efficiently and/or continuously supplied to the device.

Provided is a cathode for an electrochemical device that provides improved electrochemical characteristics compared to conventional cases by efficiently and/or continuously supplying oxygen into an electrochemical device using oxygen as a cathode active material while preventing or suppressing ingress of impurities into the device as much as possible.

Additional aspects will be set forth in part in the description which follows and, in part, will be apparent from the description, or may be learned by practice of the presented embodiments.

According to an aspect, a cathode that is used for an electrochemical device, includes: a polymer including a backbone, including a polyalkyleneimine-cobalt complex in which polyethyleneimine is coordinated to a cobalt metal; and an electrode material for an oxidation-reduction reaction of oxygen, wherein oxygen is a cathode active material.

In the cathode, the polyalkyleneimine may be cross-linked.

In the cathode, the electrode material may be carbon, or a carbon-supported catalyst.

According to another aspect, an electrochemical device for an oxidation-reduction reaction of oxygen includes: a member that reversibly adsorbs and desorbs oxygen, wherein the member includes a polymer including a backbone including a polyalkyleneimine-cobalt complex in which polyalkyleneimine is coordinated to a cobalt metal.

According to another aspect, the electrochemical device may further include: a cathode wherein oxygen is a cathode active material; an anode including metal as an anode active material; and an electrolyte interposed between the cathode and the anode, wherein the member is an oxygen supplying member that is located close to the cathode or to a member having an equipotential surface with respect to the cathode to supply oxygen to the cathode and absorb oxygen generated at the cathode.

The oxygen supplying member may be a polymer gel including the polyalkyleneimine-cobalt, wherein the polyalkyleneimine is coordinated to a cobalt metal and an ionic liquid.

The polymer gel may further include a salt of a metal as an anode active material.

The electrolyte may include a polymer gel.

The electrochemical device may be closed from the outside environment.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
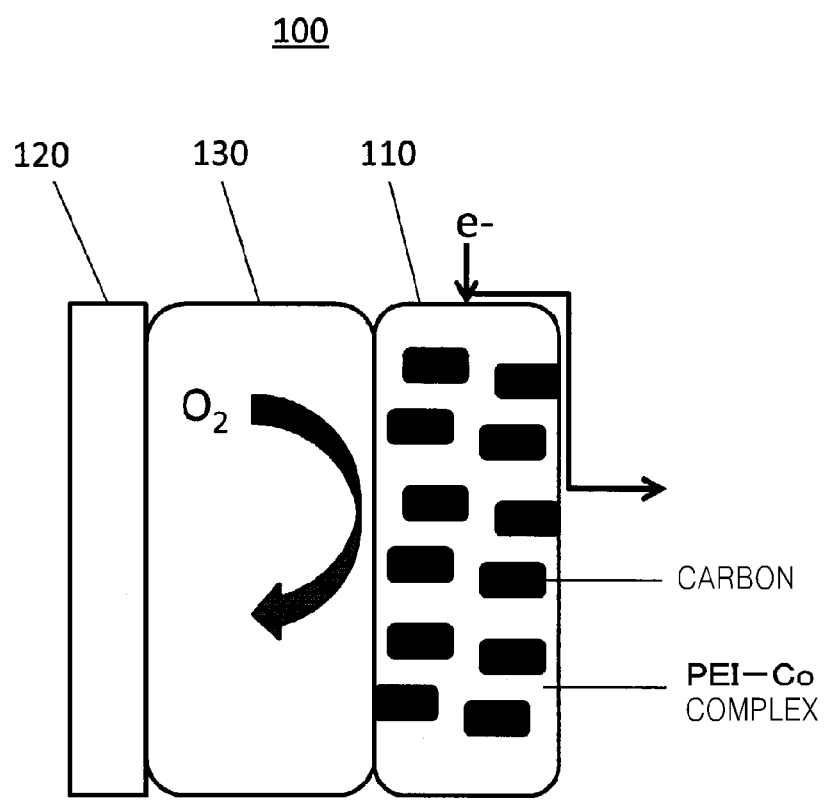
FIG. 1 is a diagram illustrating an electrochemical device according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, an electrochemical device according to an embodiment is described in detail with reference to the attached drawings.

Structure of Electrochemical Device

First, the structure of an electrochemical device according to an embodiment is described. The electrochemical device utilizes an oxidation-reduction reaction of oxygen. An example of the electrochemical device used herein may be a metal air battery or a fuel cell. Hereinafter, a metal air battery is described as an example of the electrochemical device.

A metal air battery is a rechargeable battery using oxygen as a cathode active material and metal as an anode active material. Since oxygen used as a cathode active material is obtained from the air, there is no need to fill a battery with a cathode active material. Accordingly, a space occupied by the anode active material in a battery container may be increased, and thus, at least in theory, such battery may have a greater capacity than a secondary battery which uses a solid material as a cathode active material.

In a metal air battery, during discharging, a reaction represented by a Reaction Scheme A is performed at an anode. Hereinafter, an embodiment wherein lithium is used as anode active material is described.

$$2Li \rightarrow 2Li^+ + 2e^-$$ Reaction Scheme A

Electrons generated according to the Reaction Scheme A reach a cathode via an external circuit. In addition, lithium ions (Li$^+$) generated according to the Reaction Scheme A move due to electroosmosis in a direction from the anode to the cathode in an electrolyte interposed between the anode and the cathode.

In addition, during discharging, reactions represented by Reaction Scheme B and Reaction Scheme C may be performed.

$$2Li^+ + O_2 + 2e^- \rightarrow Li_2O_2$$ Reaction Scheme B $$2Li^+ + \tfrac{1}{2}O_2 + 2e^- \rightarrow Li_2O$$ Reaction Scheme C The lithium peroxide (Li$_2$O$_2$) and lithium oxide (Li$_2$O) generated at the cathode accumulate as solid at the cathode which is an air electrode. During charging, a reverse reaction to the Reaction Scheme A is performed at the anode, reverse reactions to the Reaction Schemes B and C are performed at the cathode, and the metal (lithium) is regenerated at the anode, thereby enabling re-discharging.

Hereinafter, electrochemical devices according to embodiments are described in detail with reference to FIGS. 1 and 2.

110, the electrochemical device 100 according to an embodiment, includes a mixture including a polymer with a PEI-Co complex as a backbone and a catalyst for an oxidation-reduction reaction of oxygen, so the cathode 110 may be directly used as a supplier and absorber of oxygen.

The function of the cathode 110, as described above, is to supply and absorb oxygen. This may be possible because the cathode 110 includes a polymer having a PEI-Co complex as a backbone, and the PEI-Co complex selectively and reversibly absorbs and desorbs oxygen. In the course of functioning of the cathode 110, the PEI-Co complex selectively binds oxygen from the outside air, and supplies the oxygen to the electrochemical device for use in the oxidation-reduction reaction at the cathode 110. Accordingly, the cathode 110 may stably absorb gas including high oxygen partial pressure without absorbing impurities. Hereinafter, the PEI-Co complex, a major component of the cathode 110 will be described in detail.

PEI-Co Complex

Polyethyleneimine ("PEI") is a polymer compound represented by Formula 1 below, which forms a complex with cobalt to selectively bind to oxygen molecules present in the air. Both linear and branched (depicted by Formula 1) polyethyleneimines may be used in present embodiments. In addition, polypropyleneimine may also be used as a polyalkyleneimine instead of PEI.

Formula 1

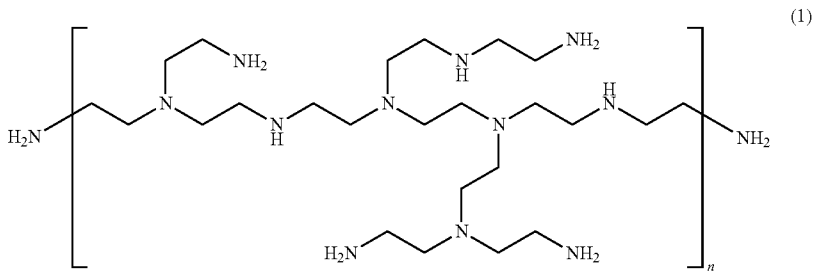

(1)

FIG. 1 is an explanation diagram illustrating an electrochemical device 100 according to an embodiment.

Referring to FIG. 1, the electrochemical device 100 mainly includes a cathode 110, an anode 120, and an electrolyte 130.

Cathode 110

The cathode 110 uses oxygen as a cathode active material. In general, a porous gas diffusion electrode is used as a cathode to increase a surface area to enable intake of oxygen in great quantities. The cathode 110 may be a composite oxygen electrode that includes a polymer having a backbone including a polyalkyleneimine-cobalt complex, for example a polyethyleneimine-cobalt complex (hereinafter referred to collectively as a "PEI-Co complex" for convenience) in which cobalt is coordinated to a polyalkylene imine, for example a polyethyleneimine, and a catalyst for an oxidation-reduction reaction of oxygen.

The electrochemical device 100 according to an embodiment uses oxygen as a cathode active material. Accordingly, it is desired that a gas having high oxygen partial pressure be efficiently supplied into the device while ingress of impurities into the device be suppressed. Accordingly, as the cathode As illustrated by the top reaction equation in Reaction Scheme Group 1, PEI may react with cobalt chloride, so that 6 nitrogen atoms in one unit of PEI become coordinated to a cobalt atom to form a PEI-Co complex ([CoN$_6$]$_2^{2+}$).

The oxygen adsorption and desorption mechanism of the PEI-Co complex may be described as follows. As illustrated in Reaction Scheme 2 below, when the PEI-Co complex formed according to the upper reaction scheme of Reaction Scheme Group 1 reacts with an oxygen molecule, first, the bond between one of the nitrogen atoms coordinated to Co and Co in the PEI-Co complex breaks, and an oxygen molecule becomes coordinated to Co in such a way that the oxygen molecule cross-links two PEI-Co complexes. As a result, as illustrated by the middle reaction equation of Reaction Scheme Group 1, a complex ([N$_5$Co—O$_2$—CoN$_5$]$^{4+}$) in which one oxygen molecule is coordinated to 2 PEI-Co complexes is formed. Thus, 2 PEI-Co complexes may enable adsorption (addition) of one oxygen molecule.

As illustrated by the lower reaction equation of Reaction Scheme Group 1, when an acid (H$^+$) is added to the PEI-Co complex coordinated to an oxygen molecule, a cobalt ion is generated, and an oxygen molecule is released. Thus, the PEI-Co complex may release (liberate) oxygen by adding an acid to the PEI-Co complex.

Reaction Scheme Group 1: Co Coordination with PEI and Oxygen Adsorption and Desorption Reaction of PEI-Co Complex

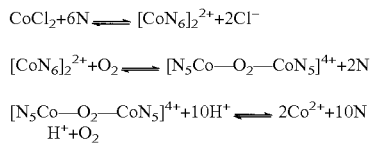

Reaction Scheme 2: Oxygen Adsorption Mechanism of PEI-Co Complex

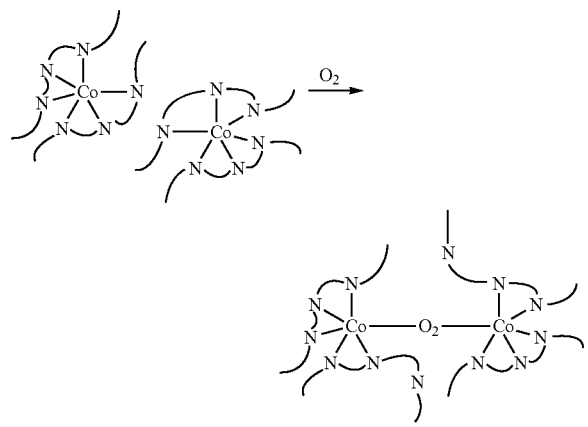

As described above, the absorbing (adsorbing) oxygen to the PEI-Co complex may lead to an increase in an oxygen absorption amount (adsorption amount) per unit of volume of the cathode 110, thereby enabling concentrated oxygen to be absorbed at low cost, and an overvoltage of the oxidation-reduction reaction of oxygen to be decreased. In addition, since an electrode itself conserves oxygen, the electrode may be easily accommodated in a battery and thus, a metal-air battery may be manufactured at a low cost.

In addition, since oxygen is absorbed by the PEI-Co complex containing polyethyleneimine ("PEI"), which has a small repeat unit, and cobalt, the cathode 110 has a high oxygen absorption amount per unit of volume thereof.

Cross-Linked PEI-Co Complex

In the PEI-Co complex, PEI may be cross-linked by a cross-linking agent. When PEI is cross-linked, the PEI-Co complex is insoluble in a non-aqueous (such as organic) or aqueous solvent. Accordingly, even when a non-aqueous or aqueous electrolytic solution is used, the cathode 110 may stably maintain its integrity as an electrode without being dissolved in an electrolytic solution. However, when an electrolytic solution that does not dissolve PEI is used, PEI does not need to be cross-linked.

As a cross-linking agent for cross-linking PEI, a polymer having chloride or epoxy groups in a pendent form, or a low molecular weight compound having two or more chloride or epoxy groups may be conveniently used. Some examples of the cross-linking agent are, but are not limited to, halides, such as polyepichlorohydrin ("PECH"), or 1,2-dibromoethane; epoxy compounds, such as bisphenol A-type epoxy resin, or trimethylolpropanepolyglycidylether; isocyanate compounds, such as toluenediisocyanate, or tolylene-2,4-diisocyanate; and carboxylic acid halides, such as succinyl dichloride, or 2,2,3,3-tetrafluorosuccinyl dichloride.

Catalyst

As a catalyst included in the cathode 110 of the electrochemical device 100, any one of various materials that are used in oxidation and reduction reactions of oxygen may be used herein. Some examples of the catalyst that are used in oxidation and reduction reactions of oxygen are a precious metal catalyst, such as platinum; a transition metal-based catalyst, such as cobalt or nickel; an organometallic catalyst, such as cobalt-porphyrin complex; and a carbon catalyst. According to an embodiment, carbon may be chosen for use as the catalyst which is mixed with the PEI-Co complex in the cathode 110, since carbon may allow an electrode to be manufactured at a low cost while maintaining electronic conductivity.

Other Components

The cathode 110 of the electrochemical device 100 may further include, in addition to the mixture including the PEI-Co complex and the catalyst, if needed, a surface reformer, a stabilizer, a leveling agent, a thickener, a binder, such as polyvinylidene fluoride ("PVDF"), or the like.

Electrochemical Device with Closed System

To completely prevent ingress of impurities into the electrochemical device 100, the electrochemical device 100 needs to be blocked (closed) from the outside air. However, when cycle characteristics of such a device are taken into consideration, securing a means for continuously supplying oxygen to the cathode 110 may become an issue.

However, in an embodiment, wherein the cathode 110 includes the PEI-Co complex, oxygen may be selectively added (absorbed or adsorbed) thereto from oxygen-containing gas. Thus, even when oxygen is not absorbed from the outside air, it may be generated at the cathode 110 during charging of the electrochemical device 100, absorbed to the cathode 110, and stored in the cathode 110. Accordingly, even when oxygen is not supplied to the cathode 110, it may be generated at the cathode 110 during charging, that is, the oxygen generated inside the electrochemical device 100 may be absorbed to the cathode 110, and thus, during discharging, the oxygen is continuously used at the cathode 110.

Accordingly, in the electrochemical device 100 having the cathode 110 including the PEI-Co complex, even when oxygen is not continuously absorbed from the outside through, for example, air intake, only the oxygen existing in the electrochemical device 100 may be continuously used at the cathode 110.

In the electrochemical device 100, due to the presence of the cathode 110 including the PEI-Co complex, there is no need to intake oxygen through, for example, air intake. Accordingly, the electrochemical device 100 may be used as a closed system. The electrochemical device 100 according to an embodiment does not have an external air intake and may be a closed to the outside environment system. Since the electrochemical device 100 is a closed system, unlike an open system having an external air intake, reduction of capacity in a battery due to an intake of the impurities, such as water, carbon dioxide, carbon monoxide, or the like, inside the electrochemical device 100 may be prevented. In addition, since installation of an oxygen tank in the electrochemical device 100 is not required, a space for storing the oxygen is not necessary, and thus, an energy density inside of the electrochemical device 100 may be maintained at higher levels.

Alternatively, a metal air battery that does not require oxygen intake may be formed by disposing a composite oxygen electrode formed by mixing carbon as a catalyst and the PEI-Co complex including oxygen in the cathode 110 and disposing an alkali metal, which has a lower potential than an oxygen oxidation-reduction potential of the cathode 110, as the anode 120 separated from the cathode 110 with the electrolyte 130 interposed therebetween. In the metal air battery, without supply of oxygen from the outside, oxidation and reduction of oxygen maintained in an electrode contribute to an electrode reaction. Accordingly, the ingress of impurities, which is a cause for deterioration of a battery, does not occur, and thus, such a battery may provide stable cycling.

Anode 120

The anode 120 includes, as an anode active material, a metal that has a lower potential than an oxygen oxidation-reduction potential of the cathode 110. Examples of metal used as the anode active material are lithium, sodium, calcium, magnesium, aluminum, zinc, and the like. During discharging, metal used as the active material of the anode 120 becomes ionized according to the Reaction Scheme A, thereby releasing electrons. Ions of metal generated according to the Reaction Scheme A reach the cathode 110 through the electrolyte 130, and the electrons reach the cathode 110 through an external circuit.

Electrolyte 130

The electrolyte 130 is interposed between the cathode 110 and the anode 120. The electrolyte 130 may not be particularly limited as long as it has conductivity with respect to metal ion (for example, lithium ion) that is formed by ionizing the anode active material. For example, an aqueous electrolysis solution, a non-aqueous electrolysis solution, a polymer electrolyte, or an inorganic solid electrolyte may be used.

Figure 2:
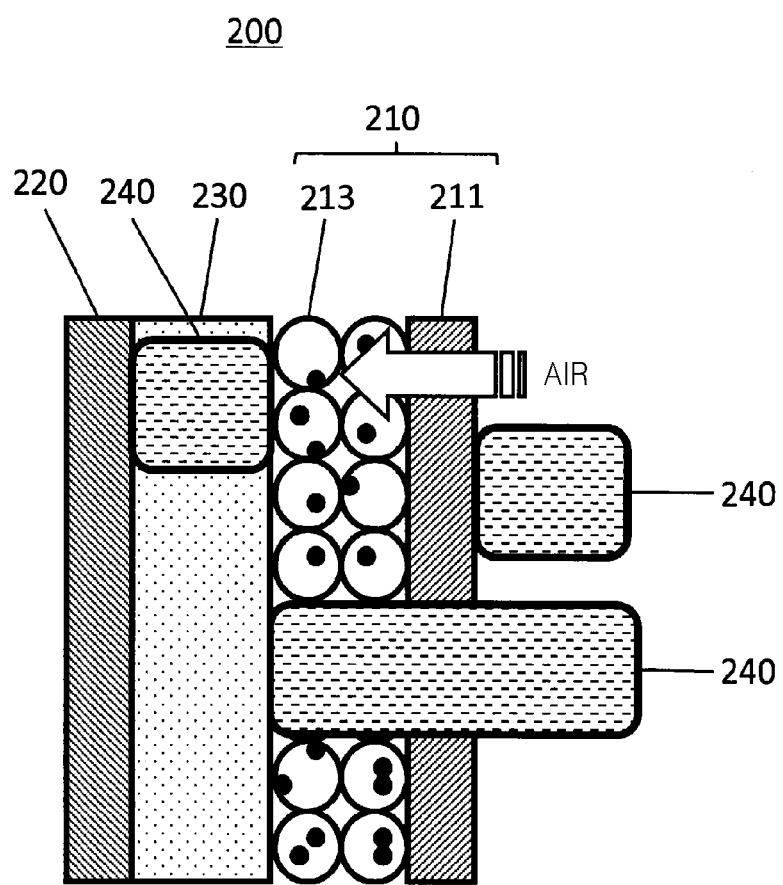
FIG. 2 is a diagram illustrating an electrochemical device according to another embodiment.

FIG. 2 is a diagram illustrating an electrochemical device 200 according to another embodiment.

Referring to FIG. 2, the electrochemical device 200 includes a cathode 210, an anode 220, an electrolyte 230, and an oxygen supplying member 240.

Cathode 210

The cathode 210 includes a gas diffusion layer 211 and a catalyst layer 213. The gas diffusion layer 211 may be installed to allow oxygen used as a cathode active material to be absorbed in a substantial quantity into the device, and may include a porous material to increase a surface area thereof. As the porous material, for example, a porous carbon material may be used. The catalyst layer 213 may include, a supported catalyst including a metal catalyst deposited on a support. As the catalyst, any known materials used for an oxidation-reduction reaction of oxygen may be used. The supported catalyst used as the catalyst layer 213 may be, for example, a $MnO_2$ catalyst deposited on a carbon support.

Anode 220

As the anode 220, a metal electrode including a metal as an active material may be used. The anode 220 may be the same as the anode 120 described with reference to FIG. 1.

Electrolyte 230

The electrolyte 230 is interposed between to the cathode 210 and the anode 220.

The electrolyte 230 may be the same as the electrolyte 130 described with reference to FIG. 1.

Oxygen Supplying Member 240

The oxygen supplying member 240 is arranged close to, i.e., on, or in the functioning proximity of the cathode 210 or close to, i.e., on or in the functional proximity of a member having an equipotential surface with respect to the cathode 210 to supply oxygen to the cathode 210 and at the same time, absorb oxygen generated at the cathode 210.

The member having an equipotential surface with respect to the cathode 210 refers to a member having the same oxidation-reduction potential as that of the cathode 210. An example of such a member is a metal mesh, a porous carbon material, or the like.

The oxygen supplying member 240, as described above, supplies oxygen to the cathode 210 and at the same time, absorbs oxygen generated at the cathode 210, because the oxygen supplying member 240 includes a polymer including the PEI-Co complex as a backbone, and the PEI-Co complex may selectively and reversibly adsorb or desorb oxygen. Since the oxygen supplying member 240 is arranged close to the cathode 210 or the member having an equipotential surface with respect to the cathode 210, the PEI-Co complex may selectively bind oxygen from the outside air and may supply oxygen to the cathode 210 or the member having an equipotential surface with respect to the cathode 210 adjacent thereto. Accordingly, the oxygen supplying member 240 may stably supply gas having a high oxygen partial pressure while suppressing the supply of impurities other than oxygen. In addition, since oxygen is absorbed to the PEI-Co complex, an amount of absorbed oxygen per unit of volume of the oxygen supplying member 240 increases, and the oxygen supplying member 240 may be used as a partition wall between the cathode 210 and an air intake of the electrochemical device 200, thereby absorbing concentrated oxygen at a lower cost and decreasing overvoltage of an oxidation-reduction reaction of oxygen. Herein, the PEI-Co complex and/or cross-linked PEI-Co complex as a major component of the oxygen supplying member 240 may be the same as the PEI-Co complex and/or cross-linked PEI-Co complex included in the cathode 110 illustrated in FIG. 1. However, herein, the cross-linked PEI-Co complex has a lower unit ratio (that is, the ratio of Co in the complex) than the PEI-Co complex, and thus, an oxygen supply amount may be decreased.

Swelling Caused by Ionic Liquid

The oxygen supplying member 240 may include a polymer gel that includes the PEI-Co complex and an ionic liquid which can solubilize the complex. The polymer gel may be prepared by swelling the PEI-Co complex with the ionic liquid.

The ionic liquid used herein is not particularly limited as long as it can solubilize the PEI-Co complex, and may be, for example, an imidazolium salt, such as 1-ethyl-3-methylimidazolium tetrafluoroborate, 1-ethyl-3-methylimidazolium bis(trifluoromethanesulfonyl)imide, 1-ethyl-3-methylimidazolium trifluoromethanesulfonate, 1-butyl-3-methylimidazolium tetrafluoroborate, 1-butyl-3-methylimidazolium bis(trifluoromethanesulfonyl)imide, or 1-butyl-3-methylimidazolium trifluoromethanesulfonate; a pyrrolidinium salt, such as 1-butyl-1-methylpyrrolidinium tetrafluoroborate, 1-butyl-1-methylpyrrolidinium bis(trifluoromethanesulfonyl)imide, or 1-butyl-1-methylpyrrolidinium trifluoromethanesulfonate; a piperidinium salt, such as 1-butyl-1-methylpiperidinium tetrafluoroborate, 1-butyl-1-methylpiperidinium bis(trifluoromethanesulfonyl)imide, or 1-butyl-1-methylpiperidinium trifluoromethanesulfonate; an ammonium salt, such as amyltriethylammonium bis(trifluoromethanesulfonyl)imide, or methyltri-n-octylammonium bis(trifluoromethanesulfonyl)imide; or a pyridinium salt, such as 1-ethyl-3-methylpyridinium bis(trifluoromethanesulfonyl)imide.

Due to the inclusion of the polymer gel in the oxygen supplying member 240 as described above, flexibility of the oxygen supplying member 240 may be improved, and a degree of freedom of arrangement of the oxygen supplying member 240 may increase. For example, when the polymer gel includes a salt of metal (e.g., an alkali metal, such as lithium) used as an anode active material, the oxygen supplying member 240 including the polymer gel may partially or completely constitute the electrolyte 230. In this case, the oxygen supplying member 240 may further act as the electrolyte 230, in addition to supplying oxygen to the cathode 210 and the absorbing oxygen may be generated at the cathode 210. In addition, due to the increase in the degree of freedom of arrangement, the oxygen supplying member 240 may be arranged close to, i.e., on or in functional proximity to a reaction zone where the oxidation-reduction reaction of oxygen at the cathode 110 occurs. Accordingly, the oxygen absorption and supply process of cathode 110 by the oxygen supplying member 240 may be smoothly performed.

Electrochemical Device of Closed System

Since the oxygen supplying member 240 includes the PEI-Co complex, oxygen may be selectively added thereto from the oxygen-containing gas. Accordingly, in addition to oxygen from the external air, oxygen generated at the cathode 210 during charging of the electrochemical device 200 may also be absorbed by the oxygen supplying member 240 and the oxygen may be stored in the oxygen supplying member 240. Accordingly, when the oxygen supplying member 240 is used, once oxygen is absorbed from the beginning by adding oxygen to the PEI-Co complex, even when oxygen is not additionally supplied to the oxygen supplying member 240, oxygen generated at the cathode 210 during charging, that is, oxygen generated inside the electrochemical device 200 is absorbed by the oxygen supplying member 240, and thus, during discharging, oxygen may be continuously used at the cathode 210.

In addition, when the oxygen supplying member 240 includes a polymer gel and the polymer gel includes a salt of a metal that may be used as an anode active material, the oxygen supplying member 240 may be used as the electrolyte 230, that is, a member that is arranged inside the electrochemical device 200.

Accordingly, since the oxygen supplying member 240 is partially or completely used as a member arranged inside the electrochemical device 200, such as the electrolyte 230, even when oxygen is not continuously supplied through the external air intake, oxygen may be stably supplied to the cathode 210 only with the oxygen existing inside the electrochemical device 200.

Since the oxygen supplying member 240 is partially or completely used as a member arranged inside the electrochemical device 200, such as the electrolyte 130, the electrochemical device 200 does not require the continuous supply of oxygen through external air intake. Accordingly, the electrochemical device 200 may be formed as a closed system that is closed from the outside environment. In addition, since the electrochemical device 200 is a closed system, unlike an open system having an external air intake, deterioration of capacity in a battery due to absorption of impurities, such as water, carbon dioxide, carbon monoxide, or the like, inside the electrochemical device 200 may be prevented. In addition, an electrochemical device in which an oxygen tank is provided inside, the electrochemical device 200 does not require a space for the storage of oxygen. Accordingly, the oxygen supplying member 240 may be arranged in the device with a high degree of freedom. In addition, when the oxygen supplying member 240 partially or completely constitutes the electrolyte 230, a volume or an energy density inside the electrochemical device 200 may be maintained at high levels.

EXAMPLES

Hereinafter, one or more embodiments are described in detail with reference to examples. However, these embodiments are not limited to the examples below.

Identification of Reversible Attachment and Detachment of Oxygen with Respect to PEI-Co Complex First, Experiment 1 and Experiment 2 below were performed to identify reversible attachment and detachment of oxygen with respect to the PEI-Co complex.

Experiment 1

20 milliliters ("mL") (0.5 mole per liter ("mol/L")) of polyethyleneimine ("PEI") aqueous solution and 4 mL (0.5 mol/L) of cobalt chloride aqueous solution were added by a syringe and mixed well to form a light red PEI-Co complex. 50 mL of oxygen was introduced thereto by the syringe and mixed with the PEI-Co complex, so that the resulting solution turned dark brown after about 40 mL of oxygen had been absorbed (about 0.5 mol of oxygen was absorbed per 1 mol cobalt). A 1 mol/L solution of HCl was added by the syringe, generating oxygen.

Another experiment was performed in the same manner as described above except that instead of water, 1-ethyl-3-methylimidazolium ionic liquid was used as a solvent. When cobalt chloride (0.5 mol/L) was dissolved in 1-ethyl-3-methylimidazolium (product of Tokyo Chemical Industry Co., Ltd.), the mixture turned blue. The formation of the complex of the ionic liquid and cobalt was confirmed. In addition, 4 mL (0.5 mol/L) of solution of cobalt chloride in the ionic liquid and 20 mL (0.5 mol/L) of PEI solution were added by the syringe and mixed well to form the complex (that is, PEI-Co complex) of cobalt and ethylene amine. The formation of the product was confirmed by identifying the color change from blue to brown. Oxygen was blown into the syringe to cause the mixture to turn dark brown, indicating that the PEI-Co complex in the ionic liquid was bound to oxygen.

Experiment 2

Figure 3:
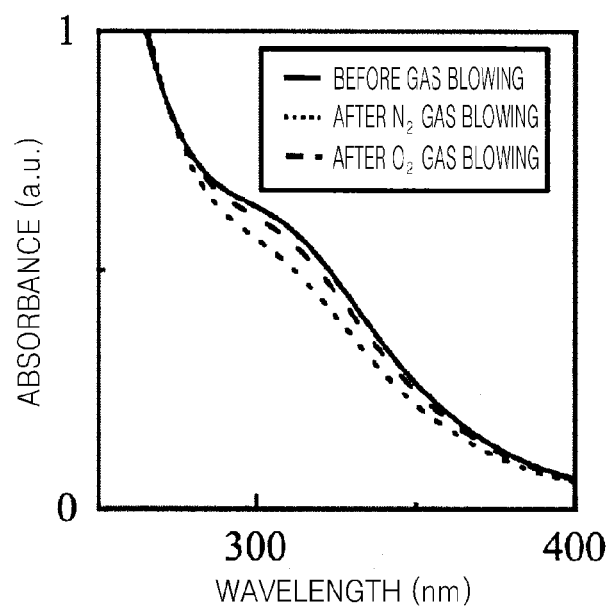
FIG. 3 is a graph of absorbance (arbitrary unit, a. u.) versus wavelength (nanometer, nm) illustrating an example of an UV-Vis absorption spectrum of a polyethyleneimine-cobalt complex measured after supplying nitrogen and oxygen gas thereto.

After reversible PEI-Co complex was formed due to change in oxygen partial pressure during the supply of $N_2$ gas, the PEI-Co complex was exposed to a mixture of $N_2$ and $O_2$ gases, and a UV-Vis absorption spectrum was obtained, which is shown in FIG. 3. As shown in FIG. 3, when nitrogen gas was supplied for a few minutes, an absorption peak at the wavelength of 310 nanometers ("nm") decreased, and when oxygen was supplied, the absorption peak increased quickly, and the same absorption point at the wavelength of 271 nm was identified, indicating that the reversible reaction represented by Reaction Scheme 3 below took place.

Reaction Scheme 3

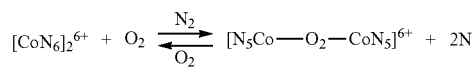

Identification of Reversible Attachment and Detachment of Oxygen with Respect to Cross-Linked PEI-Co Complex Next, Experiment 3 and Experiment 4 below were performed to identify reversible attachment and detachment of oxygen with respect to the cross-linked PEI-Co complex containing cross-linked PEI.

Experiment 3

5.0 g (116 mmol) of polyethyleneimine (PEI, product of Aldrich, Mw=$1.0 \times 10^4$) and 5.0 g (54 mmol) of polyepichlorohydrin (PECH, product of Aldrich, Mw=$7.0 \times 10^5$) were dissolved in 200 mL of DMF at the temperature of 60° C. 2.0 mL of the resulting solution was casted onto a Teflon (registered trademark) plate to thermally cross-link PEI at the temperature of 100° C. for 2 hours (see Reaction Scheme 4 below). The Teflon (registered trademark) plate was immersed in water for 30 minutes to exfoliate a cross-linked film from the plate. Subsequently, the exfoliated cross-linked film was immersed in a saturated cobalt chloride aqueous solution to obtain a dark brown cross-linked PEI-Co complex. An amount of cobalt introduced into the cross-linked PEI-Co complex was measured by considering weight change, and was found to be 15%.

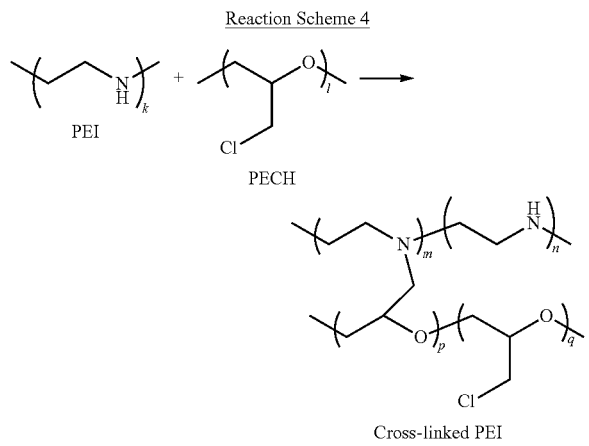

Reaction Scheme 4

Cross-linked PEI

When 20 mL of 1N HCl was added to 5.0 g of the cross-linked PEI-Co complex, about 11 mL (theoretical value: 13.3 mL) of oxygen was generated. Even in the gel state, desorption of oxygen occurred.

Experiment 4

Equilibrium of Reaction Scheme 3 may be shifted to the right by electrochemically reducing dissolved oxygen to decrease oxygen partial pressure. Release of oxygen from the PEI-Co complex was detected as a change in reduction current.

4.0 g of the cross-linked PEI-Co complex was added to 20 mL of 1.0M $LiBF_4$ propylene carbonate solution and the resulting solution was purged with $N_2$ to seal a cell. Potentiostatic bulk electrolysis was performed with −0.7 V (vs. Ag/AgCl) for 20 minutes by using a Pt/C oxygen reduction catalyst as a working electrode and Pt coil as a counter electrode. When the cross-linked PEI-Co complex was used, a reduction current value (that is, a current corresponding to a reaction in which oxygen is reduced by receiving electrons) in a steady state increased by about 60%, indicating that oxygen was released from the PEI-Co complex.

Example 1

In the present example, to evaluate an oxygen oxidation-reduction ability of a cathode using the PEI-Co complex, the PEI-Co complex was isolated and the PEI-Co complex and carbon were composited to prepare a cathode. An oxygen reduction current of the cathode was measured. Details thereof are as follows.

40 mL (0.5 mol/L) of PEI methanol solution and 8 mL (0.5 mol/L) of $CoCl_2$ methanol solution were mixed together under a nitrogen atmosphere and dried under reduced pressure to obtain dioxy PEI-Co complex as a reddish violet viscous body. Herein, the viscous body refers to a material that has high viscosity and does not flow. The dioxy PEI-Co complex from which the solvent was removed absorbed less oxygen than in a solution. However, when exposed to the air, the dioxy PEI-Co complex absorbed oxygen and thus turned brown to form oxy PEI-Co complex. The oxy PEI-Co complex was obtained in dark brown powder.

Figure 4:
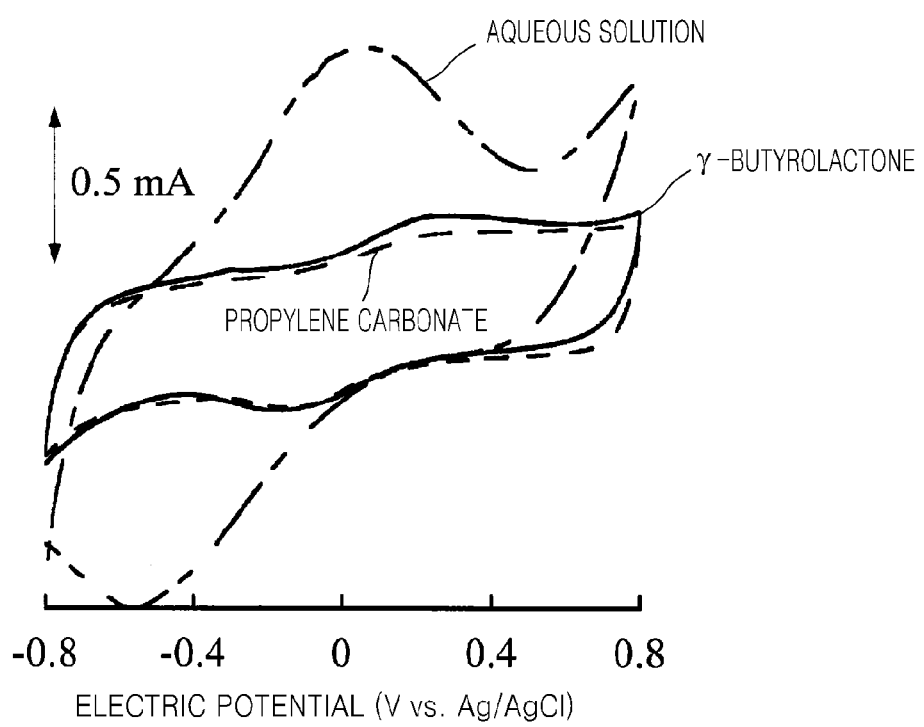
FIG. 4 is a graph illustrating results of cyclic voltammetry performed according to Example 1.

Oxy PEI-Co complex powder was kneaded with vapor growth carbon fiber (VGCF, product of Japanese Showa Denko K.K. Company), polyvinylidene fluoride (PVDF, product of Japanese Kreha Corporation) at a weight ratio of 1/8/1, and the product was coated on an ITO glass substrate and dried to obtain a carbon composite electrode. Cyclic voltammetry was performed using the carbon composite electrode as a working electrode, and a 0.1M $LiBF_4$ solution in water, propylene carbonate, or γ-butyrolactone as a support electrolyte. Herein, as a counter electrode, in an organic solvent, Li foil was used, and in an aqueous solution, a platinum mesh was used. Results thereof are shown in FIG. 4. As illustrated in FIG. 4, in an aqueous solution, an oxidation peak and a reduction peak appear at the same oxidation-reduction potential as in the solution. The oxidation peak and the reduction peak respectively indicate where maximum currents of oxidation sweeping and reduction sweeping are observed.

Example 2

In the present example, a metal air battery including the cathode prepared by compositing the PEI-Co complex and carbon and a Li electrode that is separated from the cathode with an electrolyte interposed therebetween has been manufactured, and capacity characteristics and cycle characteristics of the metal air battery have been evaluated. Details thereof are presented below.

As a cathode, a carbon composite electrode prepared by compositing the PEI-Co complex and carbon, as an anode, Li, and as an electrolyte, 1.0M $LiBF_4$ propylene carbonate solution were used to manufacture a coin cell in a globe box, and cyclic voltammetry and chronopotentiometry were performed for the coin cell. Results of the cyclic voltammetry are shown in FIG. 5, and results of chronopotentiometry are shown in FIG. 6.

Figure 5:
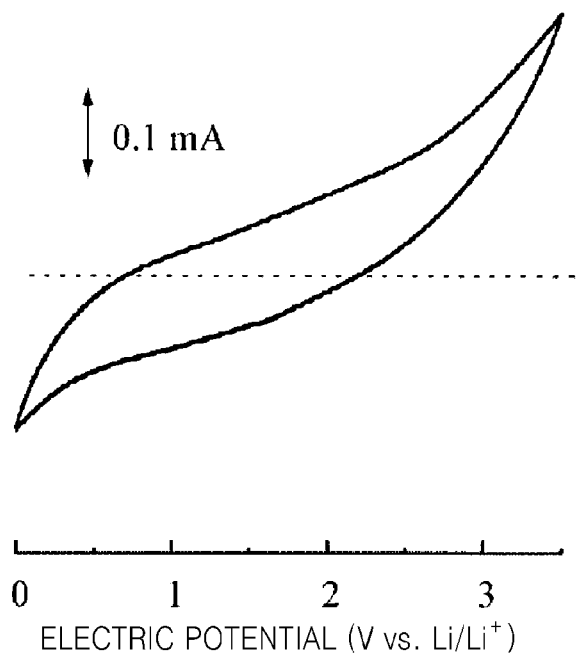
FIG. 5 is a graph illustrating results of cyclic voltammetry performed according to Example 2.
Figure 6:
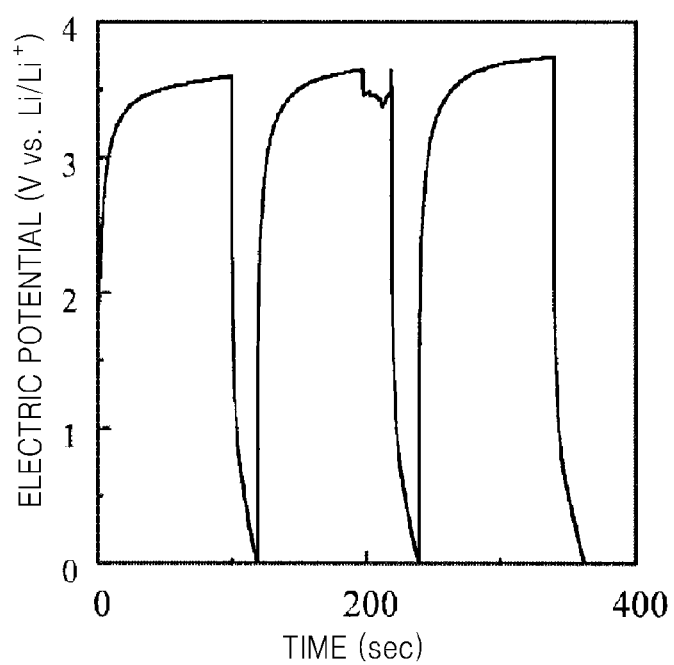
FIG. 6 is a graph of electric potential (Volts, V) versus time (second, sec) illustrating results of chronopotentiometry performed according to Example 2.

As illustrated in FIGS. 5 and 6, it was determined that the use of the carbon composite electrode prepared by compositing the PEI-Co complex with carbon as a cathode, and the use of lithium, which has a lower potential than the oxygen oxidation-reduction potential of the cathode, as an anode have lead to excellent capacity characteristics and cycle characteristics.

Example 3

In the present example, to evaluate an oxygen supply capability of an oxygen supplying member using the PEI-Co complex, an oxygen reduction current was measured with respect to a case in which the PEI-Co complex and the cathode were contacting each other. Details thereof are as follows.

Figure 7:
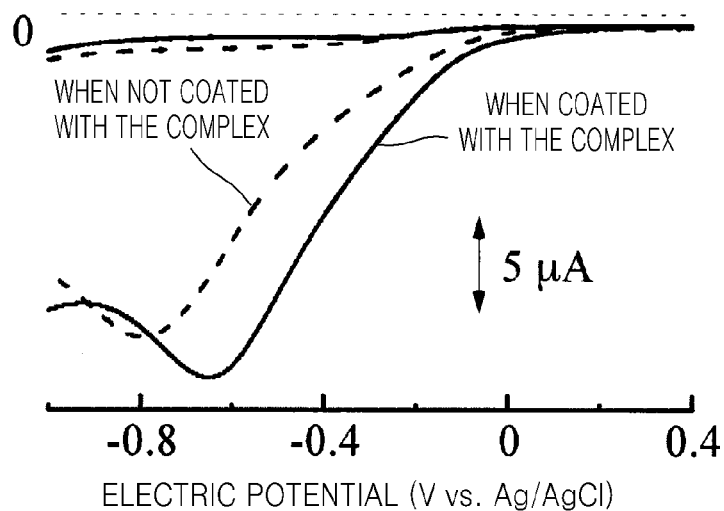
FIG. 7 is a graph showing changes in oxidation current and reduction current in a case of the electrode being coated with a complex (shown in a solid line) and in another case of the electrode not being coated with a complex (shown in a dashed line) in Example 3.
Figure 8:
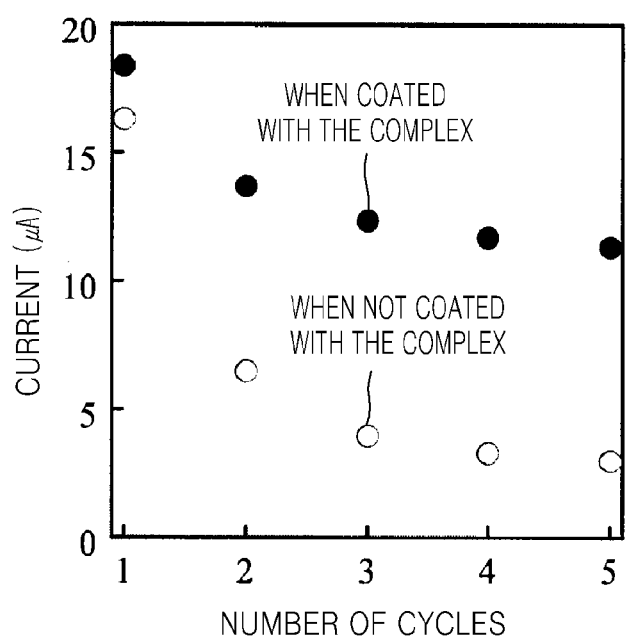
FIG. 8 is a graph of current (microampere, µA) versus number of cycles showing a change in reduction current in a case of the electrode being coated with a complex and in another case of the electrode not being coated with a complex after a plurality of potential sweeping was performed in Example 3.

An oxygen reduction current was measured by cyclic voltammetry in 1.0 M $LiBF_4$ propylene carbonate solution in an atmospheric condition and in a nitrogen atmosphere. A glassy carbon disc electrode (φ=3.0 mm) was immersed in 5 g/L of PEI-Co complex aqueous solution for 30 minutes, washed with pure water to obtain an electrode coated with the PEI-Co complex by adsorption. FIG. 7 is a graph comparatively illustrating a change of oxidation current and reduction current between when the electrode was covered with the complex and when the electrode was not covered with the complex. In addition, FIG. 8 is a graph showing a change in reduction current after a plurality of potential sweeping between when the electrode was covered with the complex and when the electrode was not covered with the complex.

As illustrated in FIG. 7, in the case when the electrode is coated with the complex under an atmospheric condition, the oxygen reduction current begins to be observed from about 0.1 Volts ("V") (vs. Ag/AgCl) and a peak appears near −0.7 V (vs. Ag/AgCl). Due to the coating with the complex, the shift of oxygen reduction potential and the increase of current were observed. As illustrated in FIG. 8, even after a plurality of potential sweeping, compared to glassy carbon electrode, a large reduction current was maintained, and due to the use of the PEI-Co complex, dissolved oxygen was efficiently supplied to the air electrode.

Example 4

In the present example, to evaluate oxygen storage capability of an oxygen supplying member using the PEI-Co complex, oxygen supplied from the cross-linked PEI-Co complex was quantified with respect to a case in which the cross-linked PEI-Co complex was used as an electrolyte. Details thereof are presented below.

Figure 9:
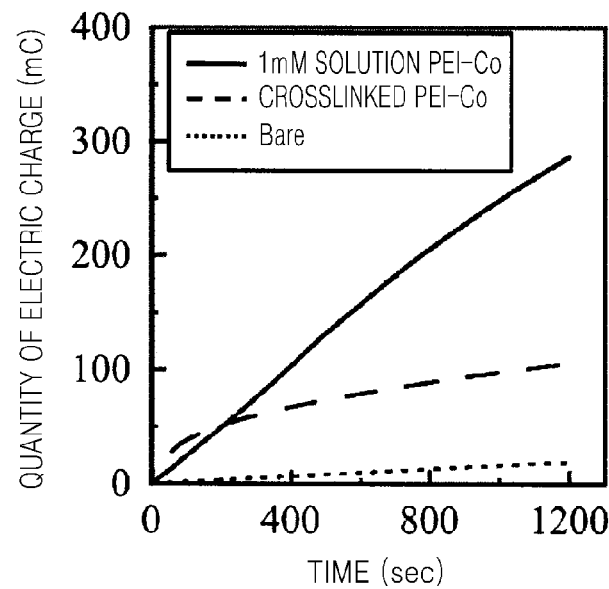
FIG. 9 is a graph of quantity of electric charge (milliCoulomb, mC) versus time (second, sec) showing quantity of electric charge measurement results of potentiostatic electrolysis results according to Example 4.

To evaluate an oxygen storage capability of polyepichlorohydrin ("PECH"), cross-linked PEI-Co complex synthesized according to Reaction Scheme 4, electrochemical oxygen reduction was performed using an oxygen reduction catalyst to quantify oxygen supplied from cross-linked PEI-Co complex based on a quantity of electric charge. 0.4 g of the cross-linked PEI-Co complex was added to 0.1M $LiBF_4$ aqueous solution (1 micromolar ("mM") solution), nitrogen bubbling was performed thereto for 15 minutes to remove dissolved oxygen, a Pt/C oxygen reduction catalyst coated on an ITO glass was used as a working electrode, and potentiostatic electrolysis was performed at an applied voltage of −1.0 V (vs. Ag/AgCl). Results thereof are shown in FIG. 9. In FIG. 9, "Bare" shows results obtained when potentiostatic electrolysis was performed at an applied voltage of −1.0 V (vs. Ag/AgCl) using Pt/C oxygen reduction catalyst coated on ITO glass as a working electrode in a 0.1M $LiBF_4$ aqueous solution while the cross-linked PEI-Co complex was not used.

As illustrated in FIG. 9, when the cross-linked PEI-Co complex exists in an electrolyte, the amount of oxygen was much more reduced, and thus, it was determined that oxygen was released from the gel-phase oxygen complex in accordance with the consumption of the dissolved oxygen. In FIG. 9, "1 mM solution PEI-Co" refers to a 1 mM complex dissolved in an electrolyte, and "cross-linked PEI-Co" means that a complex is fixed in an electrode.

Example 5

In the present example, a metal air battery in which an oxygen supplying member using the PEI-Co complex was arranged in proximity to a cathode was manufactured, and capacity characteristics and cycle characteristics thereof were evaluated. Details thereof are as described below.

An air battery was manufactured by using a typical swagelok cell (using stainless steel as an anode current collector and stainless pipe as a cathode current collector in a cell housing of ¼ inch PFA union), and a charging and discharging test was performed thereon. A metal lithium foil (thickness of 100 micrometers"μm") was compressed onto the anode current collector, and an electrolysis solution obtained by dissolving 1M lithium bis(trifluoromethanesulfonyl) imide LiTFSI in tetraglyme dried over molecular sieves was allowed to permeate into glass filter (Wattman GF/A) and arranged on the anode. As an air electrode, an electrode (Pt loading=1 milligram per square centimeter ("mg/cm$^2$") on Vulcan XC72, that is, a Pt catalyst coated on carbon paper) to which a gas diffusion layer manufactured by Electrochem Company attached was punched to a certain size for use. 0.2 milliAmpere per square centimeter ("mA×cm$^{-2}$") constant current charging and discharging was performed by galvanostat, using Cell test 1470E manufactured by Solartron Analytical in a constant-temperature oven at the temperature of 25 degrees Centigrade ("° C."). Cut-off voltages of charging and discharging were respective 4.2 V (charging) and 2.0 V (discharging).

As an example, a sheet-type gel composed of the PEI-Co complex prepared according to Experiment 1 and ionic liquid ($EMIBF_4$) was rolled and the rolled structure was inserted into a cathode pipe. In addition, as a comparative example, a cathode pipe which did not include the rolled structure was used.

Figure 10:
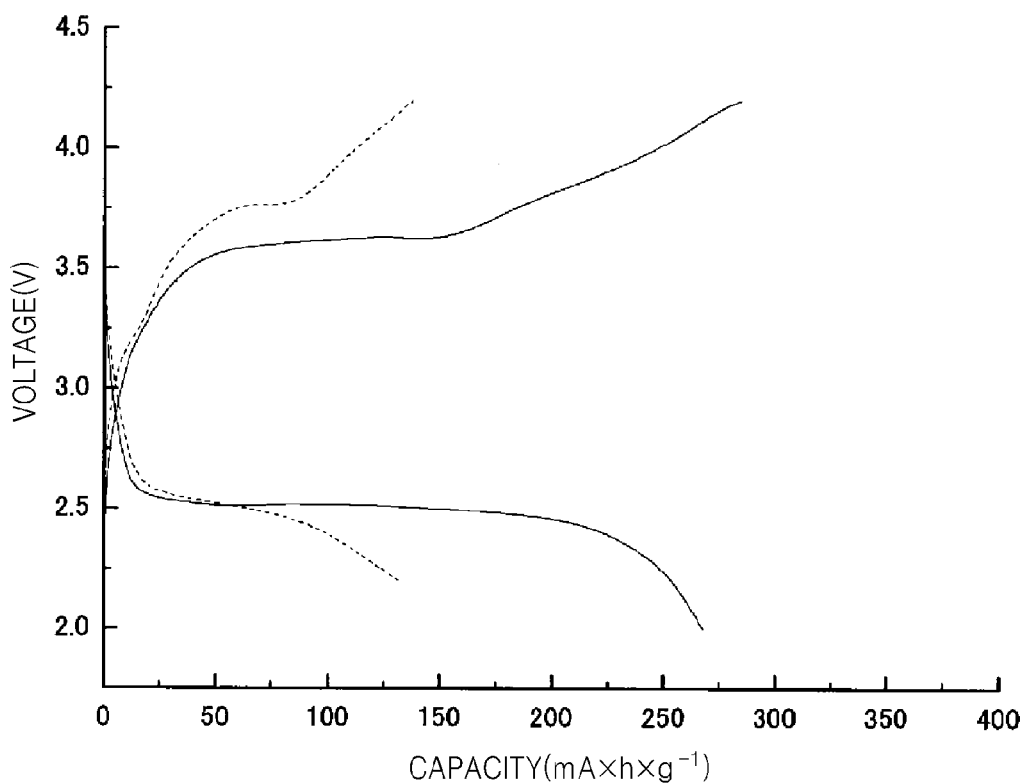
FIG. 10 is a graph of voltage (Volts, V) versus capacity (milliAmpere×hour per gram, mA×h×g$^{-1}$) showing capacity characteristics evaluation results of a charging and discharging test of a battery performed according to Example 5.

To confirm that the PEI-Co complex absorbs and releases oxygen, capacity characteristics when a cathode gas inlet was sealed with a rubber lid were evaluated. Results thereof are shown in FIG. 10. In this regard, the capacity of the air in a cell was 3.1 cubic centimeters ("cc"), which was confirmed with another cell. The dotted line in FIG. 10 shows results obtained by using, as comparative example, a battery in which the PEI-Co complex was not included in a cell, and in this case, a charging and discharging capacity was as small as 150 milli-Ampere×hour per gram ("mAhg$^{-1}$") due to the lack of oxygen. However, the battery using the PEI-Co complex, as indicated as a real line of FIG. 10, was discharged up to 260 mA×h×g$^{-1}$. This is because the PEI-Co complex that had absorbed oxygen, released oxygen when a decrease in oxygen partial pressure occurred in a cell, thereby enabling a battery reaction to proceed. Coulombic efficiency was 95% for Comparative Example, and 94% for Example, and in those two cases, there were no difference in electrode reaction and side reaction.

Figure 11:
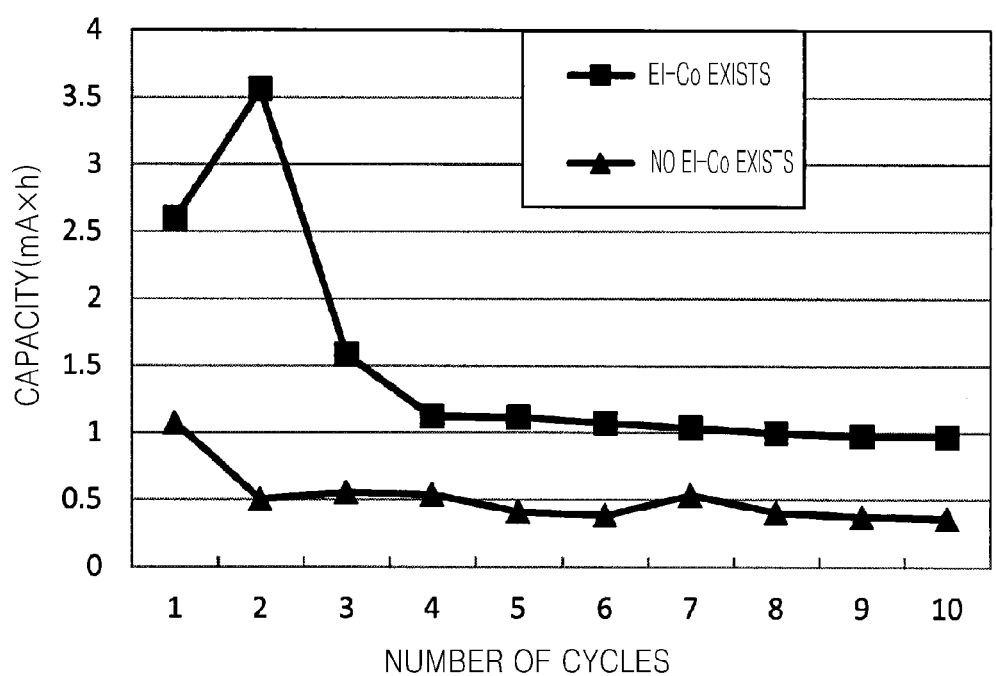
FIG. 11 is a graph of capacity (milliAmpere×hour, mA×h) versus number of cycles showing cycle characteristics evaluation results of a charging and discharging test of a battery performed according to Example 5.

FIG. 11 is a graph showing evaluation results of cycle characteristics of a charging and discharging test of the battery. As illustrated in FIG. 11, although the batteries of Example and Comparative Example had poor columbic efficiency and thus, capacity decreases according to cycle, the battery of Example (the curve indicated as "El-Co exist" in FIG. 11) including the PEI-Co complex gel, even after deterioration, maintained double capacity than that of Comparative Example (the curve indicated as "El-Co does not exist" in FIG. 11).

For example, in the embodiments, a metal air battery has been explained as an example of an electrochemical device. However, the electrochemical device is not limited thereto. For example, an electrochemical device according to an embodiment may instead be another battery, such as a fuel cell, which uses oxygen for an oxidation-reduction reaction.

According to an embodiment, an electrochemical device using oxygen as a cathode active material includes a member including a polymer having a polyalkyleneimine-cobalt in which polyethyleneimine is coordinated to a cobalt metal as a backbone, which reversibly attaches and detaches oxygen. Accordingly, ingress of impurities into the device may be prevented or suppressed as much as possible while oxygen is efficiently and/or continuously supplied, and thereby, electrochemical characteristics of the electrochemical device may be improved compared to conventional cases.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A cathode for use in an electrochemical device, the cathode comprising:
   a polymer comprising a backbone comprising a polyalkyleneimine-cobalt complex, in which a polyalkyleneimine is coordinated to a cobalt metal; and
   an electrode material effective for an oxidation-reduction reaction of oxygen wherein oxygen is a cathode active material.

2. The cathode of claim 1, wherein the polyalkyleneimine in the polyalkyleneimine-cobalt complex is polyethyleneimine.

3. The cathode of claim 1, wherein the polyalkyleneimine-cobalt complex in the backbone is cross-linked by a cross-linking agent.

4. The cathode of claim 1, wherein the electrode material is carbon, or a carbon-supported catalyst.

5. An electrochemical device for an oxidation-reduction reaction of oxygen, the electrochemical device comprising:
   a member that reversibly adsorbs and desorbs oxygen,
   wherein the member comprises a polymer comprising a backbone comprising a polyalkyleneimine-cobalt complex in which polyalkyleneimine is coordinated to a cobalt metal.

6. The electrochemical device of claim 5, wherein the polyalkyleneimine in the polyalkyleneimine-cobalt complex is polyethyleneimine.

7. The electrochemical device of claim 5, wherein
   the member is a cathode for use in an electrochemical device, the cathode comprising a polymer comprising a backbone comprising a polyalkyleneimine-cobalt complex in which a polyalkyleneimine is coordinated to a cobalt metal and an electrode material effective for an oxidation reduction reaction of oxygen wherein oxygen is a cathode active material, and
   the electrochemical device further comprises:
      an anode that comprises, as an anode active material, a metal having a potential lower than an oxygen oxidation-reduction potential of the cathode; and
      an electrolyte interposed between the cathode and the anode, wherein the electrochemical device is closed from the outside environment.

8. The electrochemical device of claim 7, wherein the polyalkyleneimine is polyethyleneimine.

9. The electrochemical device of claim 7, wherein the metal is lithium.

10. The electrochemical device of claim 5, further comprising
    a cathode wherein oxygen is a cathode active material;
    an anode comprising a metal as an anode active material; and
    an electrolyte interposed between the cathode and the anode,
    wherein the member is an oxygen supplying member that is located close to the cathode or to a member having an equipotential surface with respect to the cathode to supply oxygen to the cathode and absorb oxygen generated at the cathode.

11. The electrochemical device of claim 10, wherein the oxygen supplying member is a polymer gel comprising the polyalkyleneimine-cobalt complex and an ionic liquid compatible with the polyalkyleneimine-cobalt complex.

12. The electrochemical device of claim 10, wherein the polyalkyleneimine is polyethyleneimine.

13. The electrochemical device of claim 11, wherein the polymer gel further comprises a salt of a metal as an anode active material.

14. The electrochemical device of claim 13, wherein the electrolyte comprises a polymer gel.

15. The electrochemical device of claim 10, wherein the electrochemical device is closed from the outside environment.

16. The electrochemical device of claim 10, wherein the metal is lithium.

* * * * *